United States Patent
Ung et al.

(10) Patent No.: US 7,831,698 B2
(45) Date of Patent: Nov. 9, 2010

(54) SYSTEMS AND METHODS ENABLING INTEROPERABILITY BETWEEN NETWORK CENTRIC OPERATION (NCO) ENVIRONMENTS

(75) Inventors: Kevin Y Ung, Bellevue, WA (US); Donald B Farr, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 1454 days.

(21) Appl. No.: 10/939,865

(22) Filed: Sep. 13, 2004

(65) Prior Publication Data
US 2006/0080390 A1 Apr. 13, 2006

(51) Int. Cl.
*G06F 15/173* (2006.01)
(52) U.S. Cl. ............... 709/223; 709/203; 707/E17.116
(58) Field of Classification Search ................ 709/223, 709/203; 707/E17.116
See application file for complete search history.

(56) References Cited

U.S. PATENT DOCUMENTS

| | | | | |
|---|---|---|---|---|
| 5,794,234 | A * | 8/1998 | Church et al. ..................... 1/1 |
| 6,073,184 | A | 6/2000 | Couturier et al. |
| 6,094,688 | A * | 7/2000 | Mellen-Garnett et al. ... 719/328 |
| 6,185,625 | B1 * | 2/2001 | Tso et al. ..................... 709/247 |
| 6,230,160 | B1 * | 5/2001 | Chan et al. ....................... 1/1 |
| 6,332,163 | B1 * | 12/2001 | Bowman-Amuah ......... 709/231 |
| 6,438,594 | B1 * | 8/2002 | Bowman-Amuah ......... 709/225 |
| 6,708,172 | B1 * | 3/2004 | Wong et al. ....................... 1/1 |
| 6,721,779 | B1 * | 4/2004 | Maffeis ..................... 709/202 |
| 6,742,015 | B1 | 5/2004 | Bowman-Amuah |
| 7,152,109 | B2 * | 12/2006 | Suorsa et al. ............... 709/226 |
| 7,191,180 | B2 * | 3/2007 | Evans et al. ....................... 1/1 |
| 7,225,244 | B2 * | 5/2007 | Reynolds et al. ............ 709/223 |
| 7,289,964 | B1 * | 10/2007 | Bowman-Amuah ......... 705/1.1 |
| 7,437,417 | B2 * | 10/2008 | Reynolds et al. ............ 709/206 |
| 2001/0022837 | A1 * | 9/2001 | Vasell et al. ........... 379/102.05 |
| 2003/0023636 | A1 * | 1/2003 | Lee et al. ..................... 707/523 |
| 2003/0033283 | A1 * | 2/2003 | Evans et al. ..................... 707/1 |
| 2003/0236856 | A1 * | 12/2003 | Bird et al. ................... 709/217 |
| 2004/0017482 | A1 | 9/2004 | Bui |

(Continued)

FOREIGN PATENT DOCUMENTS

EP   1 117 033   7/2001

OTHER PUBLICATIONS

Moody, S. A.: "Challenges in Building Scalable Network Centric Real-Time Information Dissemination Systems" Object-Oriented Real-Time Distributed Computing, 2003. Sixth IEEE International Symposium on May 14-16, 2003 Piscataway, NJ, USA, IEEE, May 14, 2003, pp. 203-210.

*Primary Examiner*—Saleh Najjar
*Assistant Examiner*—Waseem Ashraf
(74) *Attorney, Agent, or Firm*—Harness, Dickey & Pierce, P.L.C.

(57) ABSTRACT

Systems and methods enabling interoperability between different NCO environments generally include receiving data from a first NCO environment by either using a preexisting import proxy, or by creating a subscriber and then using that subscriber as an import proxy when a preexisting import proxy is unavailable. The imported data can be configured if it is not in accordance with instructions received from a subscriber of a second NCO environment. The configured data can then be published to the second NCO environment by either using a preexisting export proxy, or by creating a publisher and then using that publisher as an export proxy when a preexisting export proxy is unavailable.

22 Claims, 3 Drawing Sheets

U.S. PATENT DOCUMENTS

| | | | |
|---|---|---|---|
| 2004/0174822 A1* | 9/2004 | Bui | 370/252 |
| 2005/0102260 A1* | 5/2005 | Spring et al. | 707/1 |
| 2005/0198247 A1* | 9/2005 | Perry et al. | 709/223 |
| 2005/0216555 A1* | 9/2005 | English et al. | 709/204 |
| 2005/0251527 A1* | 11/2005 | Phillips et al. | 707/101 |
| 2006/0167968 A1* | 7/2006 | Reynolds et al. | 709/202 |
| 2007/0198629 A1* | 8/2007 | Ganguly et al. | 709/203 |

* cited by examiner

SYSTEMS AND METHODS ENABLING INTEROPERABILITY BETWEEN NETWORK CENTRIC OPERATION (NCO) ENVIRONMENTS

FIELD

The present invention generally relates to Network-Centric Operation (NCO) environments, and more particularly (but not exclusively) to systems and methods enabling interoperability between different NCO environments.

BACKGROUND

Different Network-Centric Operation (NCO) environments often have interfaces that are incompatible with one another and/or are associated with different data configurations and formats. Therefore, ad hoc software applications are usually required before these different NCO environments can interoperate and share data with one another. These ad hoc software applications, however, normally require many unique interoperability services for bridging the different NCO environments together. And because these software interoperability features are specially designed for specific NCO environments, software must normally be redesigned each time any changes occur to the NCO environments themselves and/or to the programs operating within the NCO environments.

By way of further background, an NCO environment can generally refer to and include a robust, globally interconnected, network environment (including infrastructure, systems, processes, and people) in which knowledge, information, and data can be shared timely and seamlessly among users, applications and platforms within that particular NCO environment even when separated geographically or organizationally. By allowing knowledge, information, and data from even geographically or organizationally separated groups to be combined faster and in a more meaningful way, an NCO environment can facilitate decision making and coordinated action that is more effective and timely. One exemplary use of an NCO environment includes the United States Department of Defense in which an NCO environment has enabled substantially improved military situational awareness and significantly shortened decision making cycles.

SUMMARY

The present invention relates to systems and methods enabling interoperability between different Network-Centric Operation (NCO) environments. In a preferred implementation, a method generally includes receiving data from a first NCO environment by either using a preexisting import proxy, or by creating a subscriber and then using that subscriber as an import proxy when a preexisting import proxy is unavailable. The imported data can be configured if it is not in accordance with instructions received from a subscriber of a second NCO environment. The configured data can then be published to the second NCO environment by either using a preexisting export proxy, or by creating a publisher and then using that publisher as an export proxy when a preexisting export proxy is unavailable.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

According to one aspect, the invention provides the means by which different Network-Centric Operation (NCO) environments can interoperate with one another. In various implementations, interoperability software seamlessly routes and, as required, optionally configures (e.g., filters, translates, transforms, converts, etc.) data from one NCO environment to another NCO environment in a manner that can be transparent to the publishers and subscribers. In preferred implementations, this interoperability software is reusable, adaptable, and plug-able to multiple NCO environments, thereby eliminating, or at least reducing, the software development normally required to interface to a dissimilar NCO environment.

Figure 1:
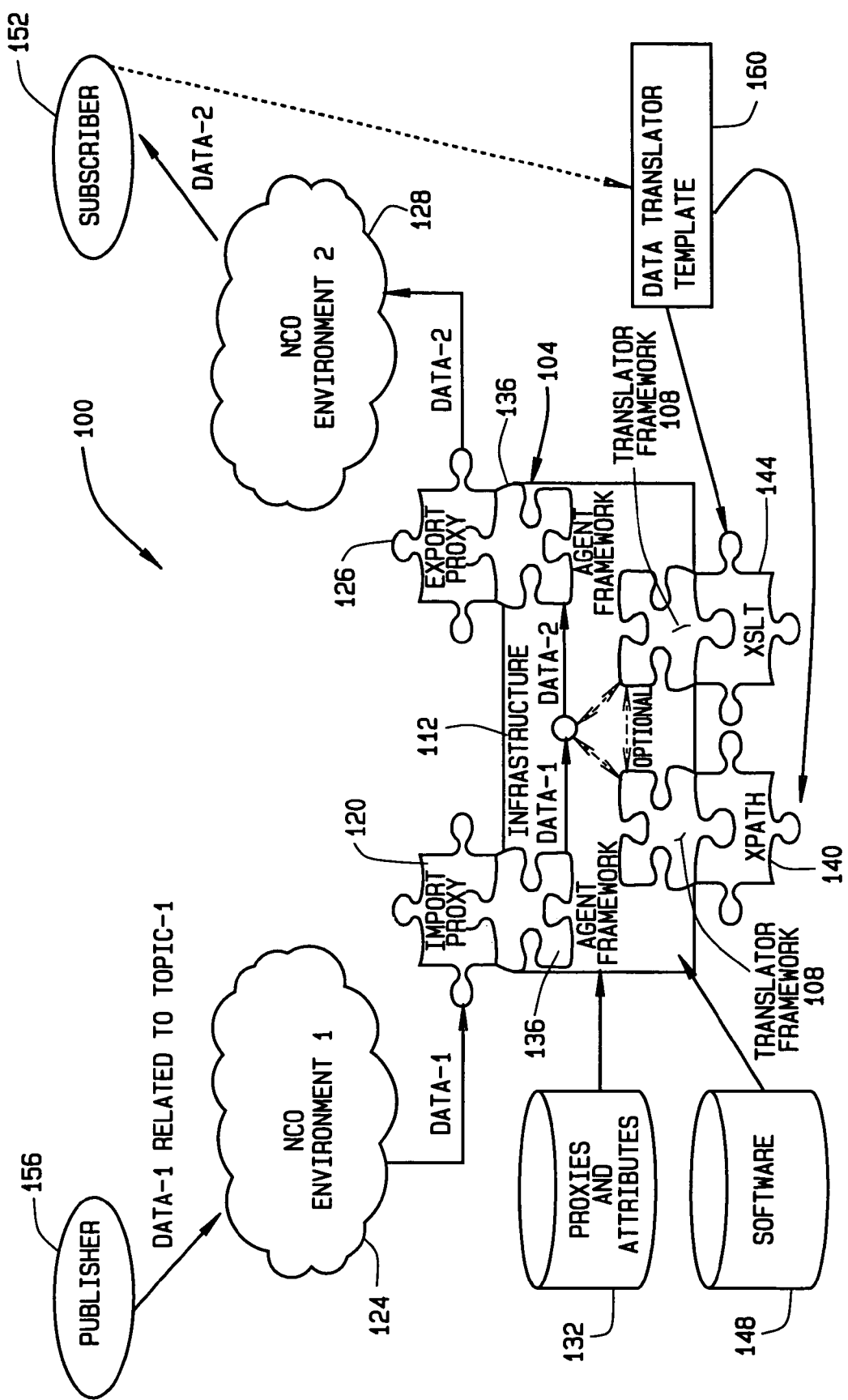
FIG. 1 is a high level diagram of a system enabling interoperability between different Network-Centric Operation (NCO) environments according to an exemplary implementation of the invention.

FIG. 1 illustrates an exemplary system 100 in accordance with the principles of this invention. As shown, system 100 generally includes an Agent Software Framework 104 and a Translator Software Framework 108. System 100 also includes a software infrastructure 112 that integrates Agent Framework 104 with Translator Framework 108. Because these software components 104, 108, and 112 are not custom/specific to any one particular NCO environment, they can be reused in connection with a variety of NCO environments. But unique features for a particular NCO environment can also be integrated into one or more of the software components 104, 108, and 112, depending on the particular application in which system 100 will be used.

The various software components 104, 108, and 112 can all reside on a single network device or be distributed on several interconnected devices or even on several interconnected networks.

In a preferred implementation, Agent Framework 104 comprises adaptable and plug-able software operable for supporting different NCO environments and business programs with minimal (or at least reduced) software application rewrites.

Figure 2:
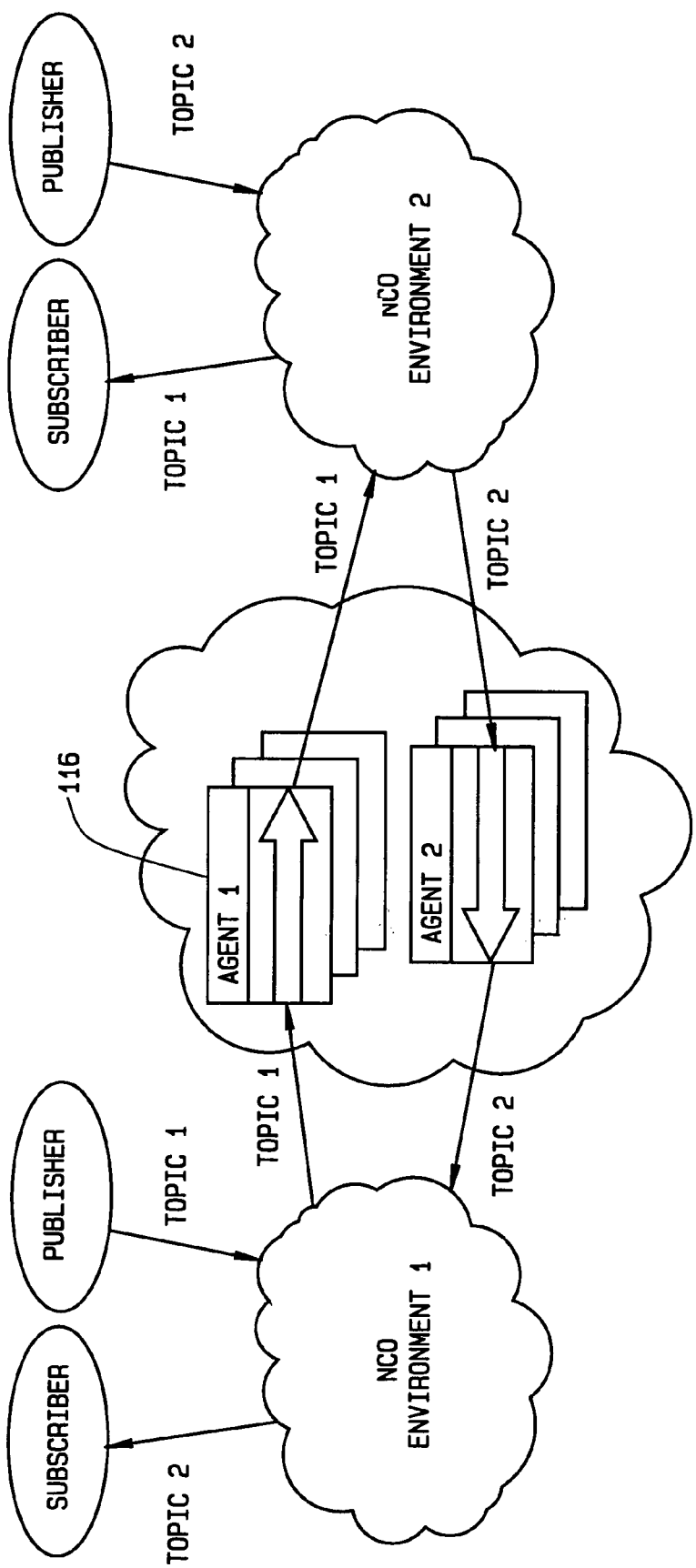
FIG. 2 is a high level diagram illustrating a system including an agent for each topic in the NCO environments according to an exemplary implementation of the invention.

As shown in FIG. 2, Agent Framework 104 can include a plurality of agents 116, preferably one for each topic. Agent Framework 104 and its agents 116 can be used to replace export and import proxies representing different or dissimilar NCO business programs.

The term "topic" can generally refer to and include information being exchanged between environments that is put into a context meaningful to the environments. An example of a topic can include tracking or targeting information which can be primarily situational awareness information to the different environments, but which has a different context for the command and control environment than it does for the attack platform.

With further reference to FIG. 1, each agent 116 includes an import proxy 120 and an export proxy 126 for respectively importing and exporting data on behalf of a subscriber. The import proxy 120 can be used to import data from one NCO environment 124, and the export proxy 126 can be used to export data to another NCO environment 128.

In preferred implementations, system 100 maintains a library or database 132 of import and export proxies (and their related attributes) from which import and/or export proxies can be selected for use as the need arises. The library 132 can also include attributes associated with each proxy so that system 100 can distinguish between the different proxies for an NCO environment. Exemplary attributes that can be associated with the proxies can include information for identifying, certifying, authenticating, and/or distinguishing between the different proxies.

Agent Framework 104 also includes façades 136. The façades 136 allow import and export proxies to be plugged into and communicate with Agent Framework 104. These façades 136 preferably allow import and export proxies to be readily interchanged with other respective import and export proxies with minimal (or at least reduced) software application rewrites.

The term "façade" can generally refer to and include a software module that provides a simplified interface to a large body of code, such as a class library. In a service oriented paradigm, a façade can allow a service requester to dynamically select a particular service provider that provides the service described in the interface. A façade also allows the service provider to be plug-able into a service framework.

Translator Framework 108 preferably includes a plug-able software framework (e.g., façade 138 in FIG. 3) that allows system 100 to use software 140 and 144 for configuring (e.g., filters, translates, transforms, converts, etc.) data between different NCO environments. In preferred implementations, system 100 maintains a library or database 148 of available software for configuring data.

In addition, Translator Framework 108 can also allow system 100 to receive from one or more subscribers software for configuring data. In this way, a subscriber 152 can provide its own software rather than selecting software from the list 148. By way of example only, a subscriber 152 might obtain one or more software translators from the Internet, and then provide the same to system 100. Software provided by a subscriber can be stored for future reuse, such as for example to configure data imported from a third NCO environment (not shown).

Figure 3:
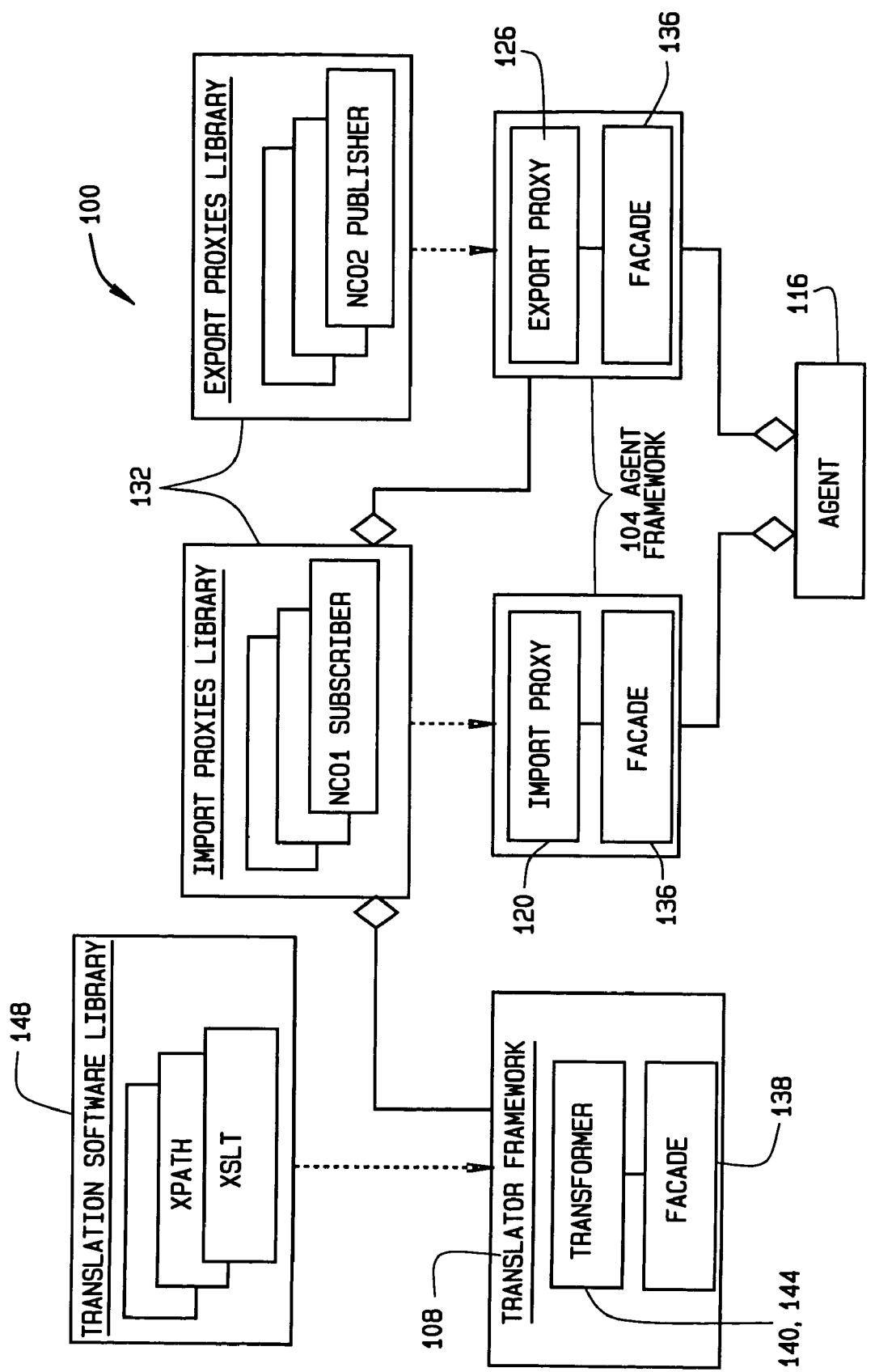
FIG. 3 is a uniform model language (UML) class diagram of a system enabling interoperability between different NCO environments according to an exemplary implementation of the invention.

In FIGS. 1 and 3, exemplary software 140 and 144 that can be used to configure data are shown respectively as XML Path Language (XPath) and Extensible Stylesheet Language Transformation (XSLT). XPath can be used for filtering data, and XSLT can be used for transforming portable document format (PDF) data to Extensible Markup Language (XML) data, and vice versa. Alternatively, other software translators can also be used including commercially available and off-the-shelf products. In FIG. 3, the diamonds represent containment, for example, NCO Subscriber1 contains export proxy 126.

With further reference to FIG. 1, a description will now be provided in connection with an exemplary operation of system 100 in which system 100 routes and optionally configures data, as required, from a first NCO environment 124 to a second NCO environment 128.

A publisher 156 may publish data (e.g., PDF data, etc.) related to a particular topic in the first NCO environment 124, such as an online publication related to fly fishing. The publisher 156 may inform others (e.g., subscriber 152, among others) about the topic and data published to the first NCO Environment 124.

A subscriber 152 may find out about the topic and have sufficient interest to register itself as a subscriber of the topic but in its own different NCO environment 128. Although the subscriber 152 to the topic (which in this particular example is fly fishing) in the second NCO environment 128 may want to access the fly fishing data, the subscriber 152 may not be able to understand the particular type of data published to the first NCO environment 124. Instead, the subscriber 152 may only be able to understand data in a certain format or configuration. For example, the subscriber 152 may be able to understand XML data, but not be able to understand PDF data.

If the subscriber 152 can only access data in a certain format or configuration, the subscriber 152 may provide instructions to system 100 on how to filter and transform data to make it understandable and accessible to the subscriber 152. By way of example, these instructions can be included within a data translation template 160 (e.g., data schema and data stylesheet) provided by the subscriber 152. The data translation template 160 can be used by system 100 when filtering and translating data from the first NCO environment 124 before publishing the data to the second NCO environment 128.

The subscriber 152 can also select one or more software translators 140 and 144 from the software library 148. In the illustrated implementation of FIG. 1, examples of such software include XPath for filtering data, and XSLT for transforming PDF data to XML data, and vice versa. Alternatively, other software translators/converters can also be used including proprietary, commercially available, and off-the-shelf products.

Rather than selecting software from the list 148, other implementations can include the subscriber 152 providing its own software. By way of example only, the subscriber 152 might obtain a software translator from the Internet, and then provide the same to Translator Framework 108 for use by system 100. Software provided by a subscriber can then be stored within the list 148 for future reuse, such as for example to configure data from a third NCO environment (not shown).

A suitable import proxy can be selected from the library 132. The selected import proxy can then be registered as a subscriber to the topic in the first NCO environment 124, thereby becoming an active participant capable of receiving receive data from the first NCO environment 124.

But when a suitable import proxy does not already exist within the library 132, a subscriber to the first NCO environment 124 can be created. This subscriber can be plugged into Agent Framework 104 via façade 136 so that this newly created subscriber can be used as an import proxy. This newly created subscriber can then be stored within the list 132 for future reuse, such as for example importing data from a third NCO environment.

A suitable export proxy can also be selected from the library 132. The selected export proxy can then be registered as a publisher to the topic in the first NCO environment 124 such that it becomes an active participant of and can publish data to the second NCO environment 128.

But when a suitable export proxy does not already exist within the list 132, a publisher to the second NCO environment 128 can be created. This publisher can be plugged into Agent Framework 104 via façade 136, thereby enabling this newly created publisher to be used as an export proxy. This newly created publisher can then be stored within the list 132 for future reuse, such as for example exporting data to a third NCO environment.

Continuing with this particular example, the import proxy 120 can import data from the first NCO environment 124. The imported data can be configured by using one or more software components 140 and 144, that is if the imported data is not already in accordance with the data template 160 provided by subscriber 152.

In the illustrated implementation, imported data can be filtered by software translator 140 (e.g., XPath, etc.). By way of example only, software translator 140 may filter the imported data to remove data already accessed by the subscriber 152, such as data published periodically to the first NCO environment 124. Whether imported data is filtered depends on the particular application.

Either before or after being filtered, imported data can also be transformed or converted by software translator 144 (e.g., XSLT, etc.) in accordance with the instructions provided by the subscriber 152. By way of example only, software translator 144 may transform PDF data to XML data, or vice versa. Whether imported data is transformed, translated, or converted depends on the particular application.

The export proxy 126 can export or publish data to the second NCO environment 128 that is in accordance with the subscriber's instructions. Ultimately, the data published by the export proxy 126 to the second NCO environment 128 can be routed to the subscriber 152 thereby allowing the subscriber 152 to access the data in the particular format or configuration that the subscriber 152 requested.

Accordingly, various implementations of the invention advantageously provide unique solutions to the ever-increasing problem of interoperability between dissimilar NCO environments. Various implementations provide the means to seamlessly route, filter, and translate information as required by the different NCO environments. In various implementations, this is accomplished using an open system architecture design that provides the users/designers of each NCO environment to specify the interoperability method by using available software components (commercial or proprietary) or by creating and interfacing a unique solution onto the interoperability core software with minimal effort. This seamless exchange of information can work in both directions so that when the users/designers of one NCO environment need to send information to another NCO environment, various implementations of this invention can route, filter, and translate the information as required.

By utilizing an interoperability software framework that is reusable, adaptable, and plug-able to multiple NCO environments, various implementations can eliminate, or at least reduce, the software development required to interface to a dissimilar NCO environment. Furthermore, aspects of the invention can be implemented with existing NCO environments with little to no changes being required for the NCO environments and their applications.

The computer readable program code can be programmed using any of a wide range of suitable computer readable programming languages that are now known in the art or that may be developed in the future. In preferred implementations, JAVA is used for Agent Framework 104, Translator Framework 108, and software infrastructure 112.

The computer readable program code can include one or more functions, routines, subfunctions, and subroutines, and need not be combined in a single package but may instead be embodied in separate components. In addition, the computer readable program code may be a stand-alone application, or may be a plug-in module for an existing application and/or operating system. Alternatively, the computer readable program code may be integrated into an application or operating system. In yet another embodiment, the computer readable program code may reside at one or more network devices (not shown), such as an administrator terminal, a server, etc.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method of providing data from one computer application in a network-centric operation (NCO) environment to another computer application in another NCO environment, the method performed by one or more processors and memory, the method comprising:

registering a first application as a publisher for a topic in a first NCO environment providing a first publish service and first subscribe service;

registering a second application as a subscriber for the topic in a second NCO environment providing a second publish service and second subscribe service, the second environment different from the first environment;

providing a first library of different proxies including different import proxies and different export proxies;

providing a second library of different software translators;

using the second application to generate and transmit a data translation template that defines how to filter and transform data such that said data will be understandable by the second application;

selecting from the first library a specific import proxy and a specific export proxy, and connecting each of the specific import proxy and the specific export proxy into a facade of an infrastructure having a plurality of façades configured to interchangeably receive a plurality of predefined import proxies, and a plurality of predefined export proxies;

using the information contained in the data translation template, selecting a plurality of predefined software translators from the second library and connecting the plurality of predefined software translators into the facades, the infrastructure configured to provide for data transfer among proxies and translators received in the facades, the selecting performed based on a plurality of attributes associated with the predefined proxies;

registering the selected import proxy as a subscriber in the first NCO environment to the topic;

registering the selected export proxy as a publisher for the topic in the second NCO environment;

receiving the data, via the selected import proxy, from the first application registered as a publisher in the first NCO environment; and publishing the data, via the selected export proxy, to the second NCO environment, the publishing performed using the second publish service.

2. The method of claim 1, wherein at least some of the predefined proxies are not selected, the selecting and connecting an import proxy comprising creating a subscriber in the first environment and connecting the created subscriber into one of the facades as an import proxy.

3. The method of claim 1, wherein at least some of the predefined proxies are not selected, the selecting and connecting an export proxy comprising creating a publisher in the second environment and connecting the created publisher into one of the facades as an export proxy.

4. The method of claim 2, further comprising storing the subscriber created and used as the import proxy.

5. The method of claim 4, further comprising reusing the stored subscriber as an import proxy.

6. The method of claim 3, further comprising storing the publisher created and used as the export proxy.

7. The method of claim 6, further comprising reusing the stored publisher as an export proxy.

8. The method of claim 1, wherein configuring the data includes using software provided by the subscriber to the topic in the second NCO environment.

9. The method of claim 8, further comprising storing the software provided by the subscriber.

10. The method of claim 9, further comprising reusing the stored software for configuring data.

11. The method of claim 1, wherein the method includes utilizing a plug-able architecture in connection with the import and export proxies.

12. The method of claim 1, further comprising routing the data published by the export proxy to the subscriber to the topic in the second NCO environment.

13. A system for providing data from one computer application in a network-centric operation (NCO) environment to another computer application in another NCO environment, the system comprising one or more processors and memory configured to:
   register a first application as a publisher for a topic in a first NCO environment providing a first publish service and first subscribe service;
   register a second application as a subscriber for the topic in a second NCO environment providing a second publish service and second subscribe service, the second environment different from the first environment;
   providing a first library of different proxies including different import proxies and different export proxies;
   providing a second library of different software translators;
   using the second application to generate and transmit a data translation template that defines how to filter and transform data such that said data will be understandable by the second application;
   select and connect each of an import proxy and an export proxy from the first library into a facade of an infrastructure having a plurality of façades configured to interchangeably receive a plurality of predefined import proxies, and a plurality of predefined export proxies,
   from the information contained in the data translation template, selecting and connecting into the facades a plurality of predefined software translators from the second library, the infrastructure configured to provide for data transfer among proxies and translators received in the facades, the selecting performed based on a plurality of attributes associated with the predefined proxies;
   the one or more processors and memory further configured to:
   register the selected import proxy as a subscriber in the first NCO environment to the topic;
   register the selected export proxy as a publisher for the topic in the second NCO environment;
   receive the data, via the selected import proxy, from the first application registered as a publisher in the first NCO environment; and
   publish the data, via the selected export proxy and via the second publish service, to at least the second application registered as a subscriber in the second NCO environment.

14. The system of claim 13, wherein the system includes a computer executable module enabling plug-able import proxies and export proxies.

15. The system of claim 13, wherein the system includes a computer executable module enabling plug-able software operable for configuring data.

16. The system of claim 13, wherein the system includes an import proxy and an export proxy for each topic about which data is published to an NCO environment.

17. A tangible computer-readable medium having instructions encoded thereon and executable by one or more processors to provide data from one computer application in a network-centric operation (NCO) environment to another computer application in another NCO environment, the instructions executable by the one or more processors to:
   register a first application as a publisher for a topic in a first NCO environment providing a first publish service and first subscribe service;
   register a second application as a subscriber for the topic in a second NCO environment providing a second publish service and second subscribe service, the second environment different from the first environment;
   provide a first library of different proxies including different import proxies and different export proxies;
   provide a second library of different software translators;
   use the second application to generate and transmit a data translation template that defines how to filter and transform data such that said data will be understandable by the second application;
   select and connect each of an import proxy and an export proxy into a facade of an infrastructure having a plurality of façades configured to interchangeably receive a plurality of predefined import proxies, a plurality of predefined export proxies;
   select and connect a plurality of predefined software translators from the second library into the facades, the infrastructure configured to provide for data transfer among proxies and translators received in the facades, the selecting performed based on a plurality of attributes associated with the predefined proxies;
   register the selected import proxy as a subscriber in the first NCO environment to the topic;
   register the selected export proxy as a publisher for the topic in the second NCO environment;
   receive the data, via the selected import proxy, from the first application registered as a publisher in the first NCO environment; and
   publish the data, via the selected export proxy and via the second publish service, to at least the second application registered as a subscriber in the second NCO environment.

18. The tangible computer-readable medium of claim 17, further comprising instructions executable by the one or more processors to enable plug-able import proxies and export proxies.

19. The tangible computer-readable medium of claim 17, further comprising instructions executable by the one or more processors to enable plug-able software operable for configuring data.

20. The tangible computer-readable medium of claim 17, further comprising instructions executable by the one or more processors to access first library of proxies from which can be selected one or more of the preexisting import and export proxies.

21. The tangible computer-readable medium of claim 17, further comprising instructions executable by the one or more processors to access the second library of software translators.

22. The tangible computer-readable medium of claim 17, further comprising instructions executable by the one or more processors to select an import proxy and an export proxy for each topic about which data is published to an NCO environment.

* * * * *